United States Patent [19]

Evans

[11] Patent Number: 5,015,541

[45] Date of Patent: May 14, 1991

[54] PROCESS FOR NEUTRALIZING SULFUR-CONTAINING CELLS

[75] Inventor: William P. Evans, Rocky River, Ohio

[73] Assignee: Eveready Battery Company, Inc., St. Louis, Mo.

[21] Appl. No.: 493,607

[22] Filed: Mar. 15, 1990

[51] Int. Cl.$^5$ ............................................ H01M 10/42
[52] U.S. Cl. ......................................... 429/49; 429/104
[58] Field of Search ..................... 429/49, 104; 423/551

[56] References Cited

U.S. PATENT DOCUMENTS

| | | | |
|---|---|---|---|
| 3,459,493 | 8/1969 | Ross | 23/1 |
| 3,932,584 | 1/1976 | Asakusa et al. | 423/551 X |
| 4,303,745 | 12/1981 | Anderson et al. | 429/86 |
| 4,446,213 | 5/1984 | Steinleitner | 429/104 |
| 4,448,859 | 5/1984 | Bishop et al. | 429/50 |
| 4,637,928 | 1/1987 | Zajac et al. | 423/659 |
| 4,652,381 | 3/1987 | Inglis | 210/724 |
| 4,732,824 | 3/1988 | Bindin | 429/104 |

OTHER PUBLICATIONS

"Treatment and Disposal of High Energy Density Lithium Cells", by William V. Zajac, Jr., Abstract No. 13, pp. 42–43, The Electrochemical Society, Fall, 1981 Meeting, Denver, Colo., Extended Abstracts, vol. 81–2.

*Primary Examiner*—Stephen J. Kalafut
*Attorney, Agent, or Firm*—Robert W. Welsh

[57] ABSTRACT

A process for treating a sulfur-containing cell by employing an oxidant, such as a hypochlorite, in conjunction with an alkaline hydrolysis solution, such as a sodium hydroxide solution, to react with the sulfur-containing products to produce sulfides and sulfites and then have the oxidant convert the sulfides and sulfites to soluble sulfates followed by neutralization of the solution with a suitable acid, such as sulfuric acid, to produce a solution safe for conventional disposal.

20 Claims, No Drawings

PROCESS FOR NEUTRALIZING SULFUR-CONTAINING CELLS

FIELD OF THE INVENTION

The invention relates to a process for neutralizing the contents of sulfur-containing cells such as thionyl chloride cells or sulfur dioxide cells, so that they can be rendered safe for conventional disposal.

BACKGROUND OF THE INVENTION

The advent of new laws concerning the disposal of hazardous waste materials may impose problems for the safe disposal of high energy density lithium cells employing a sulfur-containing component. Lithium-sulfur dioxide ($Li/SO_2$) and lithium thionyl-chloride ($Li/SOC1_2$) cells are now being manufactured with safety devices such as fuses, vents, diodes, etc. which allow them to be safely used under various conditions. The advantages of lithium-thionyl chloride cells are their high energy density, flat discharge characteristics, excellent shelf life and operability over a wide temperature range. To promote wide use of these types of cells, it is necessary that they can be safely disposed of whether they are fully discharged, partially discharged or fresh cells. In addition to a sulfur-containing component in the cells, other components such as cyanide may be present from the use of cyanide-containing electrolyte solutions.

Various chemical means have been employed by the battery industry to dispose of toxic or hazardous waste products. Simple neutralization methods have been employed in the lead-acid battery industry. For example U.S. Pat. No. 4,652,381 discloses a battery plant waste water treatment process in which a process of treating industrial waste water contaminated with environmentally unacceptable amounts of sulfuric acid and heavy metals such as lead, copper or zinc is disclosed which permits lowering of the concentration of the contaminants to a level permitting discharge to the sewer. Waste water resulting from floor wash and spray washing of lead acid batteries prior to shipment from the manufacturing facility contains sufficient sulfuric acid to cause the pH to normally be at a level of about 2 along with heavy metal contaminants present in concentrations which require treatment for removal before the discharge water will meet EPA standards. The water to be treated is directed to a first reaction and settling vessel where calcium carbonate is added along with an oxidation medium such as air which also functions to stir the stored waste water. Sufficient calcium carbonate is added to bring the pH of the solution to a level of about 5 and at the same time react with the heavy metals present such as lead, copper or zinc. Calcium sulfate and respective heavy metal carbonates precipitate and settle to the bottom of the treatment zone where they may be readily removed. In a second treatment vessel, calcium hydroxide, along with enough calcium carbonate to maintain an excess of carbonate ion, is added to complete separation of the heavy metals. Final removal of precipitate from the solution is accomplished through a suitable filter.

Reactive liquids have been used to safely dispose of residues of active metals such as sodium, potassium and lithium. For example, U.S. Pat. No. 3,459,493 discloses a process that provides a controlled method for the conversion of the active metal to the corresponding metallic compound (e.g., hydroxide, chloride) by contacting said metal with a two-layer liquid system, the top layer being a low specific gravity nonreactive liquid and the bottom layer being a high specific gravity reactive liquid. The presence of the nonreactive liquid phase limits the reaction rate between the metal and the reactive liquid, and provides a heat sink for the heat of reaction. Depending upon the objects to be achieved, the various process parameters may be altered in such a way as to insure that the reaction is always kept under control and that no dangerous buildup of byproduct hydrogen occurs. These parameters include: ratio of reactive liquid to nonreactive liquid, system temperature, choice of liquid phases, and salts present. Simple two-layer liquid systems consisting of an inert hydrocarbon oil as the top layer and water as the bottom layer are generally preferred, but in some cases it may be desirable to add other reactants, stabilizers, or antifoam agents to produce other desired results.

Chemical scrubber units have been employed to contain and neutralize corrosive fluids such as $SOCl_2$ and $SO_2$. For example, U.S. Pat. No. 4,303,745 describes a chemical scrubber unit for containing and neutralizing toxic, corrosive thionyl chloride and sulfur dioxide acid fluids vented by a primary electrochemical cell. The scrubber unit includes an inlet tube coupled to the electrochemical cell by which thionyl chloride and sulfur dioxide vented by the cell are conveyed to an elongated, generally rectangular distribution trap disposed within a housing of the scrubber unit. The distribution trap contains sodium carbonate or sodium bi-carbonate for reacting chemically with and neutralizing thionyl chloride vented by the cell and received within the trap and is itself surrounded within the housing by soda lime for chemically reacting with and neutralizing both sulfur dioxide and thionyl chloride vented by the cell and received within the trap. The distribution trap distributes and disseminates thionyl chloride and sulfur dioxide received thereby over a substantial volume for increasing the exposure of the thionyl chloride and sulfur dioxide to the neutralizing materials (sodium carbonate or sodium bi-carbonate and soda lime) thereby increasing the material utilization of the neutralizing materials.

U.S. Pat. No. 4,448,859 describes a method for deactivating a thionyl chloride cell by introducing a solution of aluminum chloride in thionyl chloride into a discharged cell and allowing the solution to react with the negative active material in the cell.

U.S. Pat. No. 4,637,928 discloses a method for neutralizing reactive material of articles such as batteries. Specifically, a method and apparatus are disclosed for treating batteries in a manner permitting safe disposal thereof, each of the articles comprising a casing having reactive material therein, wherein the article casing is opened to allow access to the interior thereof, fluid is introduced to the interior of the opened casing, and any evolved gas is removed. The steps of opening the casing, introducing fluid and removing gas are performed simultaneously in a reaction vessel which is supplied with the fluid and which is in communication with gas collecting and scrubbing means. The reaction vessel preferably comprises a deluged hammermill and a tank. The hammermill is supplied with articles by a remotely fed conveyor and which discharges into a tank, fluid is supplied to the hammermill and to the tank, and the gas collecting and scrubbing means is in communication with both the hammermill and tank. The fluid preferably is water or an alkaline neutralizing solution. The gas scrubbing means can include a first stage for removing acid gases and a second stage serving as a demister. Liquid is withdrawn from the tank, filtered to remove solids and then returned. A portion of the returned liquid is supplied to the hammermill and another portion is passed through a heat exchanger for cooling and then returned to the tank.

It is an object of the present invention to provide a method for treating high energy density sulfur-containing cells to render the cells safe for disposal.

It is another object of the present invention to provide an improved chemical disposal method for lithium cells containing a sulfur-containing component to render the cells safe for disposal.

It is another object of the present invention to provide an improved chemical disposal method for Li/SOCl$_2$ and Li/SO$_2$ cells to render the cells safe for disposal.

It is another object of the present invention to provide a chemical disposal method for sulfur-containing cells also containing toxic components such as cyanide to render the cells safe for disposal.

Other objects and advantages of the present invention will become apparent to those skilled in the art from a reading of the following detailed disclosure and the appended claims.

SUMMARY OF THE INVENTION

The invention relates to a method for treating sulfur-containing cells to render them safe for disposal comprising the submerging of an open sulfur-containing cell in an alkaline hydrolysis solution containing an oxidant in which the sulfur reacts with the alkaline hydrolysis solution to form at least one reaction product of the group consisting of sulfides and sulfites and wherein the oxidant is present in a sufficient amount to convert the sulfides and sulfites to soluble neutral sulfates. Thereafter the alkaline hydrolysis solution is neutralized with an acid such as H$_2$SO$_4$ to bring the pH at least within a neutral range required by federal, state and local regulations (e.g. pH 6-8) prior to final disposal.

If desired, the cells could be submerged in an alkaline hydrolysis solution first to produce sulfide and sulfite reaction products and then the oxidant could be added in a separate step in a sufficient amount to convert the sulfides and sulfites to soluble neutral sulfates. In addition, if any cyanide-containing products are present in the cells as part of the solvent or cosolvent of the electrolyte solution then the cyanide-containing products can be converted into harmless reaction products. For example, in certain lithium-sulfur dioxide cells, a cosolvent of acetonitrile is used which contains cyanide groups which can be converted by an oxidant such as sodium hypochlorite (NaOCl) to harmless thiocyanates and/or nitrogen gas. To avoid accidental release of chlorine gas, preferably any excess oxidant of NaOCl can be eliminated prior to acid neutralization by adding a suitable reducing agent such as a ferrous compound (e.g. FeSO$_4$) to cause the following reaction:

$$Fe^{+2}+H_2O+NaOCl \rightarrow 2Fe^{+3}+NaCl+2OH$$

In implementing the method of this invention, the cell is first opened by drilling, cutting, crushing, shredding or using any other conventional technique. This opening is preferably carried out with the cell submerged in or under a flowing stream of alkaline hydrolysis solution such as 10% potassium hydroxide (KOH) or 10% sodium hydroxide (NaOH). The pH of this solution should generally be in the 13-14 range. At this stage some of the reactions which occur for Li/SOCl$_2$ cells containing an electrolyte salt of LiAlCl$_4$ are shown below:

$$2Li+2H_2O \rightarrow 2LiOH+H_2 \uparrow (vent)$$

$$SOCl_2+2H_2O \rightarrow H_2SO_3(aq)+2HCl(aq)$$

$$H_2SO_3+HCl+3KOH \rightarrow K_2SO_3(aq)+KCl(aq)+3H_2O$$

or alternatively $$H_2SO_3+HCl+3NaOH \rightarrow Na_2SO_3+NaCl+2H_2O$$

$$S_2Cl_2*+2H_2O \rightarrow H_2S_2O_2 \text{ (thiosulphurous acid)}+2HCl$$

$$H_2S_2O_2+H_2O \rightarrow H_2S+H_2SO_3$$

$$H_2S+H_2SO_3+4KOH \rightarrow K_2SO_3+4H_2O+K_2S$$

or alternatively $$H_2S+H_2SO_3+4NaOH \rightarrow Na_2S+Na_2SO_3+4H_2O$$

$$LiAlCl_4+4KOH \rightarrow 4KCl+LiOH+Al(OH)_3$$

or alternatively $$LiAlCl_4+4NaOH \rightarrow 4NaCl+LiOH+Al(OH)_3$$

* S$_2$Cl$_2$ may be present as an additive in the electrolyte as per the teachings of U.S. Pat. No. 4,218,523 or as a liquid cathode per the teachings of U.S. Pat. No. 4,444,855 or as a decomposition product formed in situ in the cell.

A suitable oxidant such as hypochlorite or a permanganate, e.g. sodium hypochlorite (NaOCl) or potassium permanganate (KMnO$_4$), respectively, can then be added to the alkaline hydrolysis solution containing the crushed cells. As stated above, the oxidant can be added as a separate step or at the time the hydrolysis solution is prepared. Sodium hypochlorite is preferred because of its lower cost and also because it produces a colorless solution for easy viewing of equipment components. Other suitable oxidants may include persulfates or perborates of alkali metals such as sodium and potassium (excluding ammonium compounds), lithium hypochlorite and hydrogen proxide. The oxidant is used in an amount calculated to completely convert sulfide and sulfite products from the hydrolysis reactions to soluble neutral sulfates as shown below.

CONVERSION WITH PERMANGANATE $$3K_2S+3K_2SO_3+10KMnO_4+5H_2O \rightarrow 6K_2SO_4+10MnO_2+5KOH$$

$$3Li_2S*+8KMnO_4+4H_2O \rightarrow 3Li_2SO_4+8MnO_2+8KOH$$

* Li$_2$S may be present as an electrolyte additive per the teachings of U.S. Pat. No. 4,218,523.

For example, to convert the sulfates in sample cells containing 3.54g SOCl$_2$ and .34g Li, then the conversion to sulfates would require 4.94g KMnO$_4$ and 4.59g KOH per cell which would include a 5% additional amount of the oxidant as a safety margin. Generally an excess of the oxidant would be employed.

CONVERSION WITH HYPOCHLORITE $$Na_2S + Na_2SO_3 + + 5NaOCl \rightarrow 2Na_2SO_4 + 5NaCl$$

For the same size sample cell as discussed above, the conversion to sulfates would require 2.33g NaOCl and 3.40g NaOH which would include a 5% additional amount of the oxidant as a safety margin.

As stated above, the oxidant can also convert any cyanide products in the cell (e.g., cyanide groups present in an acetonitrile cosolvent in some Li/SO$_2$ cells) to harmless thiocyanates and/or nitrogen gas as shown below:

$$CN^- + NaOCl \rightarrow CNO^- + NaCl$$

or $$2CN^- + 4NaOCl \rightarrow N_2 + 4NaCl + 2CO_2$$

The presence of sufficient oxidant ion to complete these reactions can be easily monitored. In the case of hypochlorite ion, electrochemical monitoring means such as a platinum redox electrode can be used to qualitatively determine a "go/no-go" situation by comparison to calibration curves of redox electrode potential related to concentration of NaOCl in the treatment solution. In the case of permanganate ion, the characteristic pink-violet color of the solution will indicate the presence of available permanganate. A color change to clear with a brown suspended material (MnO$_2$) would indicate complete conversion and thereby signal the need for permanganate replenishment for further conversion. Basicity of the solution should also be monitored since chloride gas can evolve from the hypochlorite solutions if the pH of the solution is allowed to fall below 7.

For permanganate conversion with the minimum required amount of water, the material amounts shown in Table 1 are recommended for the number of the same size sample cells as above indicated, based on initial experimental trials.

TABLE 1

| HYDROLYSIS SOLUTION COMPONENTS | | | |
|---|---|---|---|
| | QTY./ 15 Cells | % Wt. | QTY./ 100 Cells | QTY./ 3000 Cells |
| KOH | 49.0 g | 4.1 | 327.0 g | 9800 g |
| KMnO$_4$ | 35.0 g | 3.0 | 233.0 g | 7000 g |
| H$_2$O | 1.1 l | 92.9 | 7.3 l | 220 l |
| | 1184.0 g | 100.0 | 7860.0 g | 236,800 g |
| Total Wt/3000 Cell = 522 lbs. (solution only) | | | | |

The material amounts shown in Table 2 allow for increased water.

TABLE 2

| HYDROLYSIS SOLUTION COMPONENTS | | | |
|---|---|---|---|
| | QTY./ 15 Cells | % Wt. | QTY./ 100 Cells | QTY./ 3000 Cells |
| KOH | 49.0 g | 2.6 | 327.0 g | 9800 g |
| KMnO$_4$ | 35.0 g | 1.9 | 233.0 g | 7000 g |
| H$_2$O | 1.8 l | 95.5 | 12.0 l | 360 l |
| | 1184.0 g | 100.0 | 12560.0 g | 376,800 g |
| Total Wt/3000 Cell = 832 lbs. (solution only) | | | | |

Additional amounts of water may be used if desired to reduce the temperature rise during hydrolysis and neutralization, facilitate pumping of the solution, decrease precipitation of solids in the solution and yield greater oxidation of SO$_2$. Since the hydrolysis and neutralization reactions are generally exothermic, some means of reaction rate control should be used. The solution can be cooled or diluted with larger amounts of water as mentioned above and/or the rate of addition of scrap cells can be controlled. If higher temperatures are permitted to occur, considerable water loss can occur and make-up water must be added. Maintaining hydrolysis solution temperature under 90° C., preferably under 85° C., will decrease water loss and provide safer (i.e. less vigorous) neutralization. Maintaining a moderate rate of conversion is also important to insure that any SO$_2$ generated in the reaction has adequate time to further react with the oxidant solution.

For hypochlorite conversion, the hydrolysis solution components may be used in the amounts shown in Table 3 for the indicated number of the same size sample cells. Since NaOCl is commercially available as an aqueous solution, calculations are shown both for solid NaOCl and for a 15% solution (based on calculations made for KOH and KMnO$_4$ in Tables 1 and 2).

TABLE 3

| HYDROLYSIS SOLUTION COMPONENTS | | | |
|---|---|---|---|
| | QTY./100 Cells | QTY./200 Cells | QTY./200 Cells |
| NaOH g. | 229 | 450 | 450 |
| NaOCl g. | 110 | 220 | 1470 g. 15% NaOCl Solution |
| H$_2$O gallons (liters) | 3.2 (12) | 6.4 (24) | 6.0 (22.7) |

Calculations using the measured heat generated per cell, which was found to be about 3 Kcal per cell, indicated that a batch of 600 cells could be neutralized with the temperature being maintained below 90° C using the reaction component amounts given in the first column of Table 4 which are based on experimental trials using normally filled cells which are cells that contain SOCl$_2$, Li, and LiAlCl$_4$. The figures in the second and third columns of Table 4 are based on theoretical amounts of reactants needed for maximum cell inputs of 3.54 grams SOCl$_2$ and 0.34 gram Li.

TABLE 4

| HYDROLYSIS SOLUTION COMPONENTS | | | |
|---|---|---|---|
| | QTY./600 Cells | QTY./600 Cells | QTY./600 Cells |
| NaOH (g.) | 1350 | 2040 | 2040 |
| NaOCl (g.) | 4400 g. 15% Solution | 1400 | 9300 g. 15% NaOCl Solution |
| H$_2$O gallons (liters) | 6.0 (22.8) | 7.0 (26.5) | 5.0 (18.6) |

The alkaline hydrolysis solution from the above described reactions must be neutralized with dilute acid, e.g., 5N H$_2$SO$_4$, to a neutral pH range of 6–8 prior to final disposal. Phosphoric or hydrochloric acid may alternatively be used. It is particularly important when using sodium hypochlorite to insure sufficient sodium hypochlorite is used to convert all the sulfites and sulfides to sulfates so that SO$_2$ liberation will not take place during the acid neutralization procedure as shown below:

$$Na_2SO_3 + H_2SO_4 \rightarrow Na_2SO_4 + H_2O + SO_2 \uparrow$$

The above reaction does not occur in a basic solution. A problem with undesired Cl$_2$ liberation may also occur when there is excess sodium hypochlorite present at the time of the acid neutralization step. Particularly when the cells being scrapped have leaked or have been discharged to some extent, the calculated amount of NaOCl may represent a large excess over that needed for conversion to sulfates. Thus when acid is added, the following reactions can occur.

$$3NaOCl + H_2SO_4 \rightarrow NaCl + Na_2SO_5 + H_2O + Cl_2\uparrow + O_2\uparrow$$

$$4NaOCl + 2H_2SO_4 \rightarrow 2Na_2SO_4 + 2H_2O + 2Cl_2\uparrow + O_2\uparrow$$

Excess sodium hypochlorite can be eliminated prior to acid introduction through the addition of a reducing agent such as a ferrous ($Fe^{+2}$) compound, e.g., $FeSO_4$, according to the general reaction:

$$Fe^{+2} + H_2O + NaOCl \rightarrow 2Fe^{+3} + NaCl + 2OH^-$$

The color of the solution can be used to monitor the conversion of excess sodium hypochlorite through the oxidation of $Fe^{+2}$ by the excess sodium hypochlorite, producing a reddish ferric hydroxide precipitate, to the point where all excess sodium hypochlorite has been consumed and a blue-green precipitate of ferrous hydroxide forms. The $Fe^{+2}$ compound addition thus represents a preferred step in the overall process to insure that chlorine is not liberated.

Other suitable reducing agents may include ferrous chloride, hydrazine sulfate and hypophosphorous acid ($H_3PO_2$).

Solid components such as pieces of the cell container are then removed from the neutralization solution and may be sent to a landfill. The remaining solution may be filtered, if necessary, to remove any precipitates and then the remaining solution can be appropriately disposed of in a conventional manner.

Although preferred embodiments of this invention have been described in detail it is contemplated that modifications and changes to the embodiments of the invention herein described can be made without departing from the spirit and scope of the invention.

What is claimed:

1. A method for treating sulfur-containing cells to render them safe for disposal comprising the steps:
   (a) submerging an open sulfur-containing cell in an alkaline hydrolysis solution containing an oxidant in which said solution is maintained at a pH above 8 and wherein the sulfur reacts with the alkaline hydrolysis solution to form at least one reaction product of the group consisting of sulfides and sulfites, and wherein the oxidant is present in a sufficient amount to convert the sulfides and sulfites to soluble sulfates; and
   (b) adding an acid to neutralize the alkaline hydrolysis solution of step (a) to reduce the pH of the solution to a value within a neutral range to produce a safe disposal solution.

2. The method of claim 1 wherein in step (b) the acid is added to reduce the pH of the solution to a range between 6 to 8.

3. The method of claim 1 wherein the open sulfur-containing cell is submerged in an alkaline hydrolysis solution first to form at least one reaction product of the group consisting of sulfides and sulfites and then adding an oxidant in sufficient amount to the alkaline hydrolysis solution to convert the sulfides and sulfites to soluble sulfates.

4. The method of claim 1 wherein the alkaline hydrolysis solution contains at least one compound from the group consisting of potassium hydroxide and sodium hydroxide.

5. The method of claim 1 wherein the oxidant is at least one compound selected from the group consisting of a hypochlorite, an alkali metal salt of permanganate, persulfate and perborate, and hydrogen peroxide.

6. The method of claim 4 wherein the oxidant is at least one compound selected from the group consisting of a hypochlorite, an alkali metal salt of permanganate, persulfate and perborate, and hydrogen peroxide.

7. The method of claim 1 wherein the acid in step (b) is at least one acid selected from the group consisting of sulfuric acid, phosphoric acid, and hydrochloric acid.

8. The method of claim 5 wherein the oxidant is selected from the group consisting of sodium hypochlorite, potassium permanganate, potassium persulfate and hydrogen peroxide.

9. The method of claim 8 wherein the oxidant is sodium hypochlorite in which an excess amount is added over what is necessary to convert the sulfides and sulfites to soluble sulfates and wherein a ferrous compound is added to convert the excess sodium hypochlorite to sodium chloride prior to step (b).

10. The method of claim 1 wherein the following step is added:
    (c) removing the solid components from the neutralized solution.

11. The method of claim 10 wherein the following step is added:
    (d) filtering the neutralized solution to remove precipitates from the solution.

12. The method of claim 1 wherein the oxidant is sodium hypochlorite and wherein the solution in step (a) is monitored to assure that a sufficient amount of sodium hypochlorite is present to convert the sulfides and sulfites to soluble sulfates by using a platinum redox electrode to measure the redox potential and compare this potential with a calibration curve relating redox potential to concentration of sodium hypochlorite in the treatment solution.

13. The method of claim 1 wherein the oxidant is Potassium permanganate which produces a pink-violet color in the solution and wherein the solution in step (a) is monitored to assure that a sufficient amount of potassium permanganate is present to convert the sulfides and sulfites to soluble sulfates by adding additional potassium permanganate to the solution when the solution changes from the pink-violet color to a clear color having a brown suspended material.

14. The method of claim 1 wherein the alkaline hydrolysis solution contains potassium hydroxide and the oxidant is selected from the group consisting of sodium hypochlorite and potassium permanganate.

15. The method of claim 1 wherein the alkaline hydrolysis solution contains sodium hydroxide and the oxidant is selected from the group consisting o sodium hypochlorite and potassium permanganate.

16. The method of claim 1 wherein the cell is a lithium-thionyl chloride or sulfur dioxide cell; the alkaline hydrolysis solution contains at least one compound from the group consisting of potassium hydroxide and sodium hydroxide; and the oxidant is sodium hypochlorite.

17. The method of claim 1 wherein prior to step (b) a reducing agent is added to convert any excess oxidant present in the solution.

18. The method of claim 17 wherein the reducing agent is selected from the group consisting of ferrous sulfate, ferrous chloride, hydrazine sulfate and hypophosphorous acid.

19. The method of claim 1 wherein the cell is a lithium-sulfur dioxide cell, the alkaline hydrolysis solution contains sodium hydroxide and the oxidant is sodium hypochlorite.

20. The method of claim 19 wherein the cell contains a cyanide-containing compound and the sodium hypochlorite is added in sufficient amount to convert the sulfides and sulfites to soluble sulfates and to convert the cyanide-containing compound to at least one material selected from the group consisting of a thiocyanates and nitrogen.

* * * * *